July 17, 1934.  W. M. JOHNSON  1,966,761
CUSTOMER CONTROL ACCOUNTING SYSTEM
Original Filed March 9, 1931  2 Sheets-Sheet 1
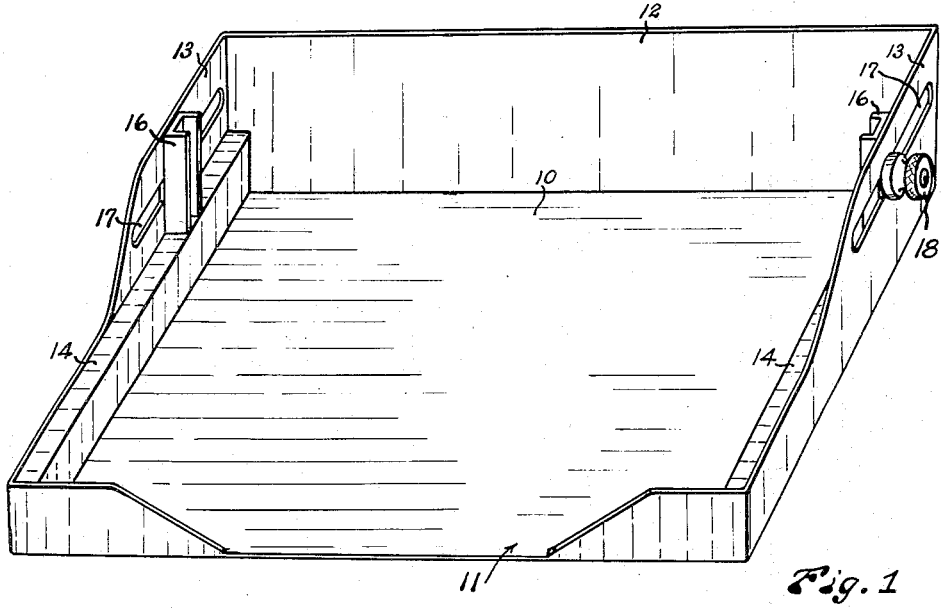
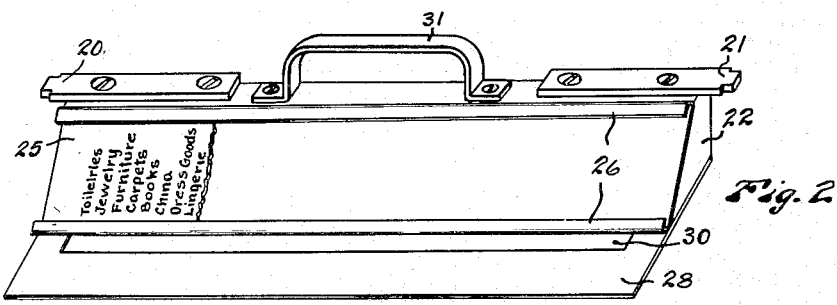
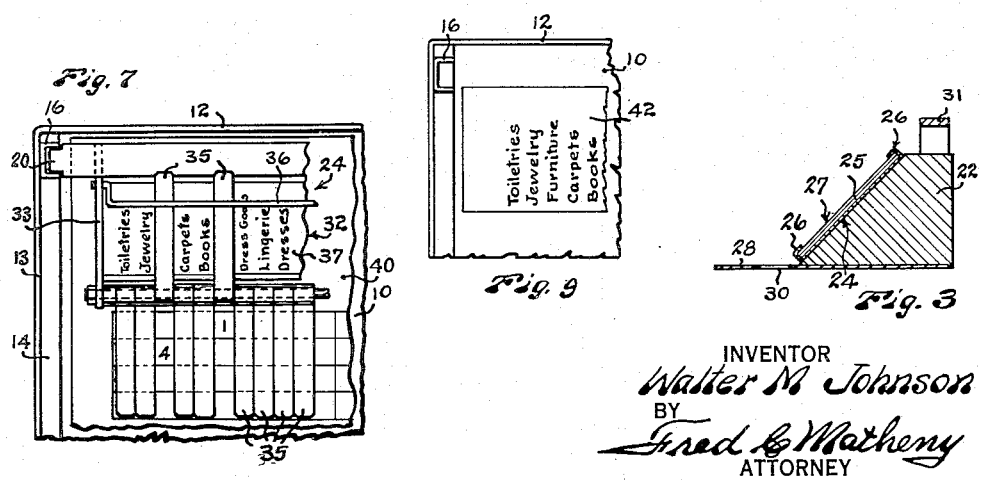
INVENTOR
Walter M Johnson
BY
Fred C Matheny
ATTORNEY July 17, 1934.   W. M. JOHNSON   1,966,761
CUSTOMER CONTROL ACCOUNTING SYSTEM
Original Filed March 9, 1931   2 Sheets-Sheet 2

INVENTOR
Walter M. Johnson
BY Fred C. Matheny
ATTORNEY

Patented July 17, 1934

1,966,761

UNITED STATES PATENT OFFICE 1,966,761

CUSTOMER CONTROL ACCOUNTING SYSTEM

Walter M. Johnson, Medina, Wash.

Application March 9, 1931, Serial No. 521,271
Renewed October 2, 1933

15 Claims. (Cl. 281—44)

My invention relates to a system of customer control accounting and the general object of my invention is to provide a simple system of such accounting and an efficient means for putting into operation and carrying out said system of accounting whereby a business institution may quickly and easily determine at any time certain desired facts relative to the personal sales habits of customers.

The invention is herein illustrated and described as embodied in a system for use as a customer control system in an ordinary department store but it will be understood that it may be used in connection with substantially any other business where a multiplicity of accounts or business transactions are to be taken care of.

Another object of the invention is to provide such a system together with the apparatus for carrying it out, the system and apparatus both having the advantages of economy, accuracy, simplicity, elasticity and accessibility and which are not heavy, nor cumbersome, nor complicated to handle and which are capable of handling either a single account or any number of kindred accounts in the same operation and which may be used to handle either a small or large range of classifications to convey information as to price, size, color, quality or other characteristics of merchandise or substantially any other desired information relative to a business transaction or transactions and the constancy of a customer's dealings.

Another object is to provide a novel form of chart for use in connection with my system, said chart being ruled to form horizontal and vertical columns each horizontal column representing a period of time, either month, season or year, and the vertical columns representing business transactions, the squares formed in the chart being arranged to have the markings placed therein.

Another object is to provide a chart upon which information may be marked in a more or less diagrammatic manner and to provide a mechanism for receiving and holding said chart during both the marking and the reading of said chart so that the chart may be easily and accurately marked and so that the meaning of the markings on the chart may be read on the mechanism.

Another object is to provide apparatus of simple and efficient construction for carrying out this system, said apparatus embodying a tray for the reception of the chart sheets, together with an element hereinafter termed a chart marking device, which is arranged to be placed on the sheets within the tray for facilitating the markings or posting of the sheets and another element, hereinafter termed a chart reading device also arranged to be placed within the tray on the chart sheets to make possible the reading of the matter recorded on the chart sheets.

More specific objects in connection with this apparatus are to provide means in the tray for adjustably and removably, and interchangeably, supporting both the chart marking device and chart reading device whereby each of said devices is freely movable vertically when in use and rests upon the chart sheets within the tray, thus holding the chart sheets in place and being automatically self adjusting to any quantity of chart sheets of different thicknesses, and whereby horizontal placement on the chart sheets either of the marking device or the reading device may be manually made to secure the desired horizontal columnar registration of either of said devices with the chart sheet; and to provide a chart reading device having movable means for selectivity covering up or exposing portions of any desired column on the chart sheet on which it rests.

Customer control is essentially an improvement over the old card index systems, rendering the information thereon more complete and accessible and classified so as to produce certain well defined results.

In order to accomplish these results, any system of customer control must first be simple in construction and easily understood. It must be elastic enough to meet any condition that might arise. It must be accurate in every detail. Always in alphabetical order. It must be easy to record and make selections of one or any number of kindred accounts at one setting. Speed of operation is a vital factor in either operation. Visibility as an aid to efficiency must be well provided for rendering it possible for the operator to work at full speed when needed. It must be easy to install, inexpensive to operate and ready at any moment to do that which it is intended for, a first aid to the manager, credit department, sales manager and the department manager.

The system of customer control and apparatus which I have built covers all of the above functions, mechanically, it is fool proof and does not draw upon the ability of the operator to correct mechanical problems. There is nothing to get out of order. It conforms to the usages of good accounting by using a single sheet to an account which is the only one that can work out successfully. It gives to the store a chart of the trading habits of the customer, setting forth what the person does purchase, when he purchases it and consequently what he does not purchase and what he ought to or reasonably could be expected to purchase. It will give warning of a falling off of the trade and supply the solution at the same time. Consequently it can be used to increase trade and also to hold the old customer. It is always in alphabetical order and ready for use. It is a system that can post every sale by month, season or year giving price range, size, color, credit rating and other qualifications according to the information desired. It can be extended to any number of classifications by extending the machine in either direction. It provides means for giving a cross-section analysis of any number of accounts, will thus give an accurate accounting of the stores activities by departments and making it possible to discover the source of much trouble.

Other and more specific objects of my invention will be apparent from the following description taken in connection with the accompanying drawings.

In the drawings Figure 1 is a perspective view of a tray embodied in my invention as the same may appear when all chart sheets and apparatus are removed therefrom.

Fig. 2 is a perspective view of the chart marking device showing the same removed from the tray, a fragment of a listing strip being shown therein and the remainder of said listing strip being broken away.

Fig. 3 is a cross sectional view of a chart marking device.

Fig. 7 is a fragmentary plan view of the chart reading device in the tray and resting on a chart certain tabs of the chart reading device being raised.

Fig. 9 is a fragmentary plan view of apparatus of this invention showing the column headings on an element separate from the chart sheets and separate from the chart marking and chart reading devices.

Figure 4:
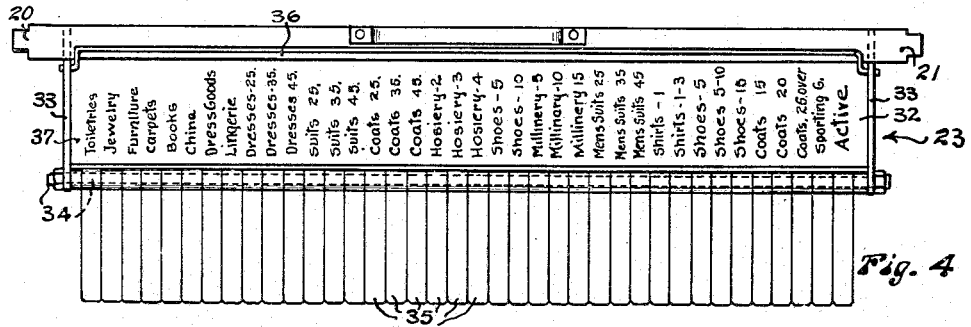
Fig. 4 is a plan view of a chart reading device used in connection with my invention, showing all of the tabs lowered.

In substantially every form of business concern which deals with the public, it is of advantage to have an accounting or record system which affords accurate and readily available information relative to the trading habits of each customer. The requirements for such a system in a retail store as applied to any individual account may be to show whether or not the account is active or has been active within a predetermined period of time, and, if the account is active, to show what goods of various kinds have been purchased and the approximate date of their purchase and the value of the goods and any other information relative to the goods or the customer which may be of value to the store in the conduct of the business with the customer. The present methods of handling this information is very inadequate, inaccurate, cumbersome, and vague to the point of neglecting it entirely, although the information contained therein is of great value to every one concerned in the management of the store. Systems with one posting to each classification through a year's time are grossly deficient. Systems built upon a multiple sheet are as much out of order in a customer control as in the usual books of account. Systems thrown out of alphabetical order easily add labor difficulties to the office and ultimately are discontinued by reason of their own deficiencies. My present system makes this information quickly and easily available for the following reasons:

1. It provides for a single sheet for each customer, preferably 8½ by 11 inches, to fit the usual filing cases in an office. Although any size may be used at the option of the user.

2. My sheets are always in alphabetical order making recording rapid and accurate. Also giving a speed to selection in keeping with the needs of the system.

3. My postings can be by month, season or year according to the concern's needs.

4. With my system both chart and machine can be extended to meet any condition in special classifications, also giving as might be desired, size, price range, color, or any other qualification including credit rating, occupation and income.

Referring to Fig. 1, I show a relatively shallow tray 10, preferably of rectangular shape with the front side wall cut away between the two ends as at 11. The rear wall 12 and the rear portions 13 of the end walls are preferably of greater depth than the remainder of the end walls and the fragmentary portions of front wall. Strips 14 are preferably provided just inside of each end wall, said strips forming shoulders 15 which are substantially flush with the top edges of the end walls toward the front of the tray. Upright guide members 16 are provided inside the deeper portions 13 of the end walls of the tray. These guides are slidably mounted for horizontal movement by means of slots 17 in the deeper portions 13 of the end walls of the tray and said guides may be locked in any desired position by thumb nuts 18. This affords a manual adjustment of the guides to position other parts for column alignment with the chart as hereinafter explained.

The guide members 16 are adapted for the reception of guide elements 20 or 21 which project beyond the ends of bar members 22 or 23. The bar member 22 forms the principal part of what I have herein termed a chart marking guide while the bar member 23 forms the principal part of what I have herein termed a chart reading guide. The bar member 22 of the chart marking guide is of substantially triangular cross sectional shape whereby an inclined wall 24 is afforded at the front side, on which a listing strip 25 may be displayed. This listing strip is preferably removably held within groove forming members 26 and may be covered by a transparent protecting member 27. A flat plate 28, preferably of metal, is secured to the bar member 23 and extends forwardly therefrom and is cut away as at 30 to afford a slot through which one of the horizontal columns of the chart on which the selective device rests may be exposed for marking up purposes. The plate 28 is thin and flat and the cut away portion 30 forms a slot through which markings may be conveniently made in the exposed horizontal column of the chart, it being apparent that the other adjacent portions of the chart will be covered up thereby precluding the placing of marks in the wrong horizontal column. A handle 31 may be provided on the bar member 23 for convenience in handling.

Figure 5:
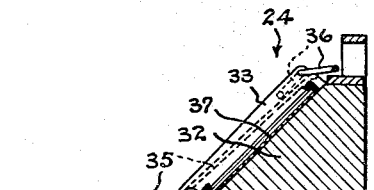
Fig. 5 is a cross sectional view of the chart reading device shown in Fig. 4, showing by dotted lines a tab in a raised position.

The chart reading guide, Figs. 4 and 5, which is used in the tray when readings are being taken off of the charts, comprises a bar member 32 of triangular cross section, having means at each end, as plates 33, which form supports for the ends of a rod 34. The rod 34 extends lengthwise along the front edge of the bar 32 and has a plurality of tab members 35 pivotally mounted thereon. These tab members may be hinged in other ways if desired. The tab members 35 may be allowed to lie flat on the chart or may be turned upwardly against the inclined front side of the bar 32. A retainer wire 36 is provided for holding the upper ends of the tab members 35 when said tab members are raised. A listing strip 37 is provided on the inclined front side of the bar member 32. The markings on the listing strip 37 are ordinarily a duplicate of the markings of the listing strip 25 of the previously described chart marking device.

The chart used in connection with my invention is made on a sheet of paper of suitable size and shape to fit within the tray 10. Whereby it is correctly positioned relative to the recording device or the selective device. These charts may be varied to suit different requirements but will essentially comprise upright and transverse columns formed by intersecting upright and transverse lines on the sheet. The form of chart used as an example in the present application comprises two chart fields 38 and 39 on a sheet 40. Each field is intended to cover a period of one year, divided into four transverse columns each representing three months time, and divided into enough vertical columns to allow one vertical column for each desired classification of merchandise.

For the purpose of this description I have assumed that the upper horizontal column represents the first quarter and the successive lower columns the second, third, and fourth quarters of the year respectively. Obviously each horizontal column may represent one month or one year or any other desired period of time.

An example of the operation of my invention is as follows: In posting the charts the sheets 40 are placed in the tray 10 and the posting device placed thereon and adjusted manually to bring the slots 30 into registration with the desired transverse column on the sheet. From sales slips, books, or other sources of information, the exposed transverse column in the chart is then marked, in the proper upright columns, to indicate the nature and date of the purchase. For instance, the chart shown in Fig. 6 has been marked to indicate that the customer made the following purchases during the first three quarters of the year; in January lingerie, in April a coat costing $45.00 or more, in July shoes, in September millinery, the figures on the chart indicating the month of purchase and the vertical columns in which the figures appear being read with reference to the reading device listing strip to indicate the nature of the merchandise. The check mark at the upper right square indicates an active account. The charts herein illustrated will ordinarily be posted at from one to three month intervals, the two chart fields on each sheet taking care of an account for two years. More chart fields may be used on each sheet if desired.

In reading or obtaining information from the charts the sheets are placed in the tray 10 and the selective device placed thereon and adjusted so that the tabs 35, when lowered, cover the entire chart which is to be read. The articles upon which it is desired to obtain information are then noted on the listing strip 37 and the tabs 35 in alignment with these articles are turned up to reveal the markings on the charts in these upright columns thus allowing the markings in these columns to be readily observed as the sheets are pulled out one at a time from underneath the selective device. The weight of the selective device holds the sheets 40 against accidental displacement but allows them to be successively withdrawn as the desired information is obtained off of them.

The name of the customer is preferably displayed in the lower right corner of each chart sheet.

Figure 6:
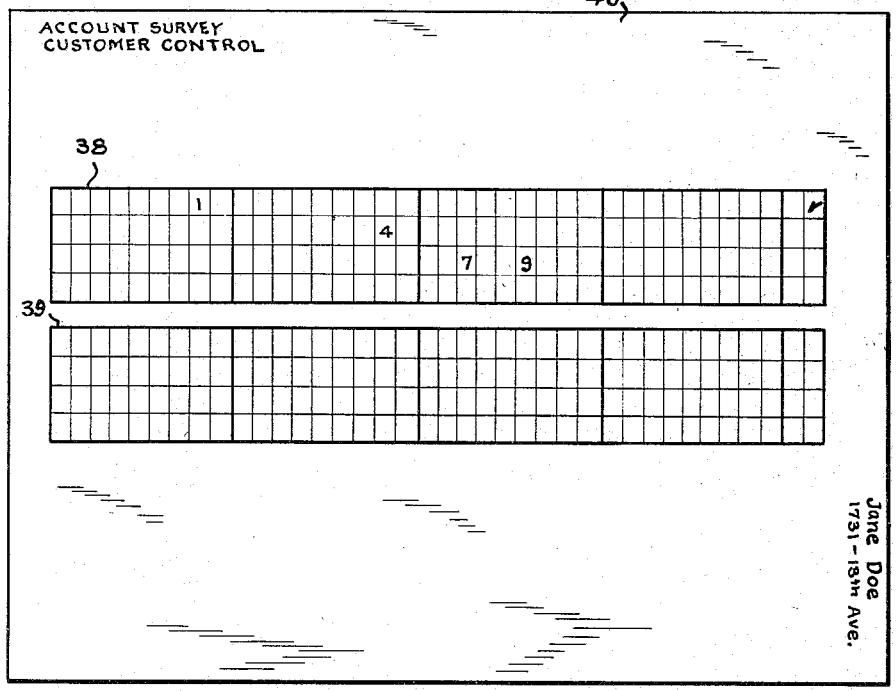
Fig. 6 is a plan view of a chart embodied in my invention.

If, for instance, a store is sending out advertising matter on shoes they will know by the chart shown in Fig. 6 that this customer bought shoes on a certain date and can better judge whether or not to include this customer in their mailing list. Other information relative to the account is obtained or read in the same way.

Obviously two or more substantially duplicate trays may be used, some of said trays for marking up and others for reading the sheets being interchangeable in the various trays and the headings on the marking and reading devices being duplicates.

Figure 8:
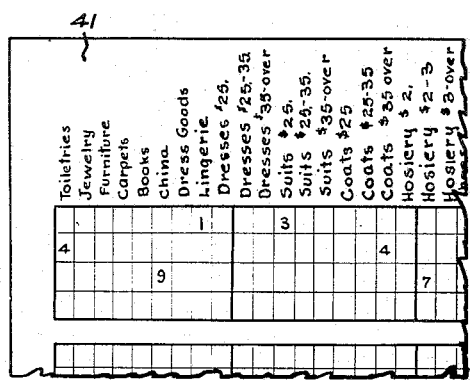
Fig. 8 is a fragmentary plan view of a modified form of chart having column headings marked thereon.

In Fig. 8 I have disclosed a form of chart sheet 41 in which the headings or listings are displayed directly on the chart sheet. Where this is done the chart sheet may be used without the tray and without the use of the chart marking and chart reading devices although it is not so convenient nor so rapid nor so accurate as when used with these devices. The headings or listings may also be displayed directly in the tray or trays as indicated at 42 in Fig. 9 and the chart sheets placed in this tray for marking or reading.

The foregoing description and accompanying drawings clearly disclose a preferred embodiment of my invention but it will be understood that this disclosure is merely illustrative and that such changes in the invention may be made as are fairly within the scope and spirit of the following claims.

I claim:

1. In a customer control system of keeping accounts, for use with a chart affording two sets of intersecting columns, one set representing intervals of time and the other set representing business departments and transactions, a holder for holding and positioning the charts, and a guide positioned by the holder and arranged to rest on the charts, said guide having openings therein exposing predetermined sections of the charts.

2. In a customer control system for keeping accounts, for use with a chart, a holder for holding and positioning said chart and a chart marking guide positioned by said holder and operatively supported relative to said chart and having openings therein exposing predetermined sections on said chart, said chart marking guide having headings thereon.

3. In a customer control system for keeping accounts, for use with a chart having upright and transverse intersecting columns, means for holding and positioning said chart and a chart marking guide positioned by said holding means and resting on said chart, said chart marking guide having a longitudinal marking up opening registering with one of the transverse columns of said chart.

4. In a customer control system for keeping accounts, for use with a chart having upright and transverse intersecting columns, a tray for receiving said chart, and a chart marking guide positioned within said tray and resting on said chart, said chart marking guide having headings thereon in alignment with the upright columns of said chart and having a longitudinal opening registering with one of the transverse columns of said chart.

5. In a customer control system for keeping accounts, for use with a chart having upright and transverse intersecting columns, a tray for receiving said chart, a chart marking guide positioned within said tray and resting on said chart, said guide having headings thereon in alignment with the upright columns of said chart and having a longitudinal opening registering with one of the transverse columns of said chart, and means in said tray for guiding said chart marking guide, said means being adjustable whereby the opening in said chart marking guide may be moved into registration with any predetermined transverse chart column.

6. In apparatus of the class described, for use with a chart having upright and transverse intersecting columns, tray means for receiving and positioning said chart, a chart marking guide and a chart reading guide interchangeably usable relative to said chart, and adjustable guide devices in the tray means for receiving and positioning said chart marking guide and said chart reading guide.

7. In apparatus of the class described, for use with a chart having upright and transverse intersecting columns, tray means for receiving and positioning said chart, a chart marking guide and a chart reading guide interchangeably usable relative to said chart, guide means in the tray whereby said chart marking guide and said chart reading guide are positioned and duplicate listings on said two guides correspondingly positioned relative to the upright columns of said chart.

8. In apparatus of the class described, for use with a chart having upright and transverse intersecting columns, tray means for receiving and positioning said chart, a chart marking guide and a chart reading guide interchangeably usable relative to said chart, means embodied in said chart marking guide for selectively exposing any desired transverse column on said chart and means on said chart reading guide for selectively exposing one or more desired vertical columns on said chart.

9. In apparatus of the class described, for use with a chart having upright and transverse intersecting columns, tray means for receiving and positioning said chart, a chart marking guide and a chart reading guide interchangeably usable relative to said chart, said chart marking guide having a longitudinal slot exposing a desired transverse column of said chart for marking, and tab members pivotally mounted on said chart reading guide for selectively covering or exposing any desired number of upright columns on said chart.

10. In apparatus of the class described, for use with a chart having upright and transverse intersecting columns, tray means for receiving and positioning said chart, a chart marking guide and a chart reading guide interchangeably usable relative to said chart, said chart marking guide having a longitudinal slot exposing a desired transverse column of said chart for marking, and tab members pivotally mounted on said chart reading guide for selectively covering or exposing any desired number of upright columns on said chart, said chart marking guide and said chart reading guide each having duplicate listings of headings displayed thereon in corresponding positions relative to the upright columns of said chart.

11. In apparatus of the class described, for use with chart means having upright and transverse intersecting columns, a tray for receiving said chart means, a chart marking guide arranged to be placed within said tray on said chart means, said guide having headings in alignment with the upright columns of said chart means and having a slot registering with one of the transverse columns of said chart means and a chart reading guide arranged to be used in said tray to replace said chart marking guide said chart reading guide having headings corresponding to the headings on said chart marking guide and having means for exposing any desired upright columns of said chart means and covering the remaining upright columns of said chart means.

12. In apparatus of the class described, for use with chart means having upright and transverse intersecting columns, a tray for receiving said chart means, a chart marking guide arranged to be placed within said tray on said chart means, said guide having headings in alignment with the upright columns of said chart means and having a slot registering with one of the transverse columns of said chart means, a chart reading guide arranged to be used in said tray to replace said chart marking guide said chart reading guide having headings corresponding to the headings on said chart marking guide and having means for exposing any desired upright columns of said chart means and covering the remaining upright columns of said chart means, and means for adjustably supporting said chart marking guide or said chart reading guide.

13. Apparatus of the class described, for use with charts each having upright and transverse intersecting columns, embodying means for holding and positioning said charts and a chart reading guide operatively supported relative to said charts and having means for selectively covering up or exposing any predetermined upright columns of said charts.

14. Apparatus of the class described, for use with charts each having upright and transverse intersecting columns, embodying means for holding and positioning said charts and a chart reading guide operatively supported relative to said charts, and resting on said charts and having pivotally mounted tabs movable into different positions to selectively upright columns on said charts.

15. In apparatus of the class described, a chart holding tray of relatively shallow rectangular construction having its front wall cut away for a substantial distance and having end walls which are of less depth adjacent the front of the tray and of greater depth adjacent the rear of the tray and having a rear wall of substantially the same depth as the deeper portions of said end walls, said deeper portions of said end walls having horizontal slots and vertical guide channels having mounting means extending into said slots and longitudinally adjustable along said slots.

WALTER M. JOHNSON.